Patented Jan. 23, 1923.

1,443,097

UNITED STATES PATENT OFFICE.

PETER E. SINNETT, OF BUFFALO, NEW YORK.

BUILDING MATERIAL AND PROCESS OF MAKING THE SAME.

No Drawing.   Application filed November 26, 1920.   Serial No. 426,628.

*To all whom it may concern:*

Be it known that I, PETER E. SINNETT, a citizen of the United States, residing at Buffalo, in the county of Erie and State of New York, have invented a new and useful Improvement in Building Materials and Processes of Making the Same, of which the following is a specification.

This invention relates to compositions of matter which may be used as building materials or the like.

The objects of the invention are to provide a composition of this kind which may be molded or formed into the desired shape or form and which may be worked with the usual woodworking tools; also to produce a composition of this kind which is fireproof and strong and not materially affected by moisture or by changes in temperature; also to provide a composition of this kind into which nails or screws may be driven without chipping or splitting the same; also to improve compositions of this kind in other respects hereinafter specified.

The composition consists mainly of fibrous material, such, for example, as sawdust, ground wood, or the like, which can be packed or molded into a fairly compact mass without the use of pressure, and a binding and fireproofing material, which causes the fibers or wood particles to adhere together and which renders the composition fire and water proof. The substances used for this purpose are magnesium chloride and magnesium oxide, which are combined while mixed with the ground wood or other fibrous material. The mixture may be formed into the desired shape by any suitable means, for example, by pouring the mixture into molds in which it is allowed to set or harden. The magnesium oxide and chloride, in addition to forming a binder and joining the particles of sawdust or other fibrous material, also render the same fireproof.

In the manufacture of the composition, the following process is preferably used:—Dry sawdust, ground wood, or other fibrous material is saturated with a solution of magnesium chloride, preferably having a specific gravity from 1.16 to 1.26 at 15° C., the time required to saturate the wood depending upon the nature of the material, pine sawdust requiring approximately fifteen minutes. I have found that the best results are obtained by using fibrous material which has the property of readily absorbing water or other liquids and for this reason I prefer to use dry soft wood sawdust or ground soft wood, although other fibrous material may be used. The excess solution is then removed from the fibrous material, preferably by subjecting this material to slight pressure. A quantity of magnesium oxide, preferably in powdered form, is then thoroughly mixed with the material to a dough-like consistency, the quantity varying from an amount substantially equal to the weight of the magnesium chloride in the material to five times this amount. In order to effect a thorough mixing of the magnesium oxide with the sawdust or analogous material, the mixture may be agitated, stirred or otherwise treated, and after a thorough mixing has been effected, the material is molded or otherwise formed into the desired shapes or sizes and allowed to set or harden. In making the material, approximately 90 per cent of fibrous material is used and by using material which will readily absorb moisture, the solution of magnesium chloride thoroughly penetrates the fibrous material and thus renders the material fire proof. Any other process for making the material may be employed if desired.

The reaction which takes place when this composition is formed is probably as follows:

When the magnesium oxide is brought in contact with the solution of magnesium chloride an oxychloride of magnesium is formed which probably has the following formula: $MgCl_2.5MgO$. This compound combines with some of the water forming a hydrate of the oxychloride, which not being soluble as the oxychloride, begins to crystallize out in the pores of the fibrous material and drives the water now freed to the surface of the fibrous material. This water reacts with more of the oxychloride and the process is repeated again, forming another network of crystals, and so on until finally by the interlocking of the different nets of crystals, the composition described is obtained. The fibrous material acts in the capacity of a filler and the chloride and oxide of magnesium renders the binding and fire-proofing qualities. The large proportion of fibrous material in the composition gives the same a degree of toughness which makes it possible to drive nails or screws into the same and to work the same with wood working tools, whereas compositions containing larger proportions of the magnesium compounds are hard and brittle. By using fibrous material which readily absorbs moisture, the crystallization of the oxychloride takes place within the pores of the fibrous material, so that a very secure binding effect between the particles of fibrous material and the magnesium compounds takes place.

It is well known that the chloride and oxide of magnesium with water will form a hard, brittle substance or cement which cannot be worked by means of woodworking, but the composition hereindescribed is not brittle but has a certain amount of toughness and can be worked in the same manner as wood. The composition may be utilized for many different purposes, such for example, as wall board, sheathing board, joists, beams, etc. Since the material can be molded into any desired shape, it can easily be combined with a reinforcing fabric or structure of wire, rods or the like, so that beams or pillars of great strength can be produced. The material can also be molded on or around fabric, such as burlap or canvas to produce thin sheets of great strength, since the fibers or threads of the textile material are combined with the binding material in the composition to form a substantially unitary structure with the textile material. If it is desired to use this material for interior purposes, it can be veneered in a similar manner as wood. Furthermore, the material can be painted in the same manner as wood, and since the material is waterproof, it does not warp or swell.

I claim as my invention:

1. A building material comprising mainly fibrous material saturated with magnesium chloride to render the same fire resisting and a binder formed by combining magnesium chloride and magnesium oxide to tie together the particles of fibrous material.

2. A building material comprising mainly fibrous material saturated with magnesium chloride to render the same fire resisting and a crystalline binder which penetrates the fibrous material and which holds the fibrous material together to form a firm non-brittle unitary mass.

3. A building material comprising finely divided particles of soft wood saturated with magnesium chloride to render the same fire resisting and a binder including a crystalized hydrate of magnesium oxychloride.

4. A building material consisting of about 90 per cent by volume of finely divided wood particles, and a binder including a combination of magnesium chloride dissolved in water and with which the wood particles are saturated and, magnesium oxide, which combines with the magnesium chloride solution.

Witness my hand this 24th day of November, 1920.

PETER E. SINNETT.